US012803062B2

(12) United States Patent
Xu et al.

(10) Patent No.: US 12,803,062 B2
(45) Date of Patent: Nov. 17, 2026

(54) BATTERY, ELECTRIC APPARATUS, AND METHOD AND APPARATUS FOR PREPARING BATTERY

(71) Applicant: CONTEMPORARY AMPEREX TECHNOLOGY (HONG KONG) LIMITED, Hong Kong (CN)

(72) Inventors: Chenyi Xu, Ningde (CN); Junxiang Ma, Ningde (CN); Xiaoteng Huang, Ningde (CN); Jun Liu, Ningde (CN); Haiqi Yang, Ningde (CN); Langchao Hu, Ningde (CN); Danyue Xue, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 760 days.

(21) Appl. No.: 18/345,261

(22) Filed: Jun. 30, 2023

(65) Prior Publication Data

US 2023/0344017 A1 Oct. 26, 2023

Related U.S. Application Data

(63) Continuation of application No. PCT/CN2021/134386, filed on Nov. 30, 2021.

(51) Int. Cl.

*H01M 10/42* (2006.01)
*H01M 50/244* (2021.01)
*H01M 50/383* (2021.01)

(52) U.S. Cl.

CPC ..... *H01M 10/4207* (2013.01); *H01M 50/244* (2021.01); *H01M 50/383* (2021.01); *H01M 2220/20* (2013.01)

(58) Field of Classification Search

None
See application file for complete search history.

(56) References Cited

U.S. PATENT DOCUMENTS

2022/0118861 A1 4/2022 Zeng et al.

FOREIGN PATENT DOCUMENTS

CN 207117140 * 3/2018
CN 207117140 U 3/2018
(Continued)

OTHER PUBLICATIONS

The European Patent Office (EPO) The Extended European Search Report for Application No. 21965888.7 Sep. 2, 2024 7 Pages.
(Continued)

*Primary Examiner* — Basia A Ridley
*Assistant Examiner* — Heng M. Chan
(74) *Attorney, Agent, or Firm* — ANOVA LAW GROUP, PLLC

(57) ABSTRACT

A battery includes multiple battery cells arranged in a first direction and each provided with a pressure relief mechanism configured to be actuated when the internal pressure or temperature of the battery cell reaches a threshold to relieve the internal pressure, a fire-extinguishing pipe configured to accommodate a fire-extinguishing medium and to release the fire-extinguishing medium during actuation of the pressure relief mechanism, a restraining member disposed at an end of the multiple battery cells along the first direction and configured to restrain the multiple battery cells in the first direction, and a fastener attached to a surface of the restraining member facing toward the fire-extinguishing pipe and configured to fasten the fire-extinguishing pipe.

13 Claims, 11 Drawing Sheets

15

(56) References Cited

FOREIGN PATENT DOCUMENTS

| | | | | | |
|---|---|---|---|---|---|
| CN | 109585726 | A | * | 4/2019 | .......... H01M 50/383 |
| CN | 209804782 | U | | 12/2019 | |
| CN | 112018462 | A | | 12/2020 | |
| CN | 112072046 | A | | 12/2020 | |
| CN | 112086604 | A | | 12/2020 | |
| CN | 113113709 | A | | 7/2021 | |
| JP | 2018206656 | A | | 12/2018 | |

OTHER PUBLICATIONS

The World Intellectual Property Organization (WIPO) International Search Report and Written Opinion for PCT/CN2021/134386 Aug. 29, 2022 19 pages (including English translation).

* cited by examiner

BATTERY, ELECTRIC APPARATUS, AND METHOD AND APPARATUS FOR PREPARING BATTERY

CROSS-REFERENCE TO RELATED APPLICATION

This application is a continuation of International Application No. PCT/CN2021/134386, filed on Nov. 30, 2021, the entire content of which is incorporated herein by reference.

TECHNICAL FIELD

This application relates to the field of battery technologies, and in particular, to a battery, an electric apparatus, and a method and an apparatus for preparing a battery.

BACKGROUND

Energy conservation and emission reduction are crucial to sustainable development of the automobile industry. In this context, electric vehicles, with their advantages in energy conservation and environmental protection, have become an important part of sustainable development of the automobile industry. For electric vehicles, battery technology is an important factor in connection with their development.

In the development of battery technology, safety is another non-negligible issue in addition to performance improvement. If the safety of a battery cannot be guaranteed, the battery cannot be used. Therefore, how the safety of batteries is enhanced is an urgent technical problem that needs to be solved in battery technology.

SUMMARY

Embodiments of this application provide a battery, an electric apparatus, a method and an apparatus for preparing a battery, so as to enhance the safety of batteries.

A first aspect provides a battery including: multiple battery cells arranged in a first direction, where the battery cell is provided with a pressure relief mechanism, the pressure relief mechanism being configured to be actuated when internal pressure or temperature of the battery cell reaches a threshold, to relieve the internal pressure; a fire-extinguishing pipe configured to accommodate a fire-extinguishing medium, where the fire-extinguishing pipe is configured to release the fire-extinguishing medium during actuation of the pressure relief mechanism; a restraining member disposed at an end of the multiple battery cells along the first direction, where the restraining member is configured to restrain the multiple battery cells in the first direction; and a fastener attached to a surface of the restraining member facing toward the fire-extinguishing pipe, where the fastener is configured to fasten the fire-extinguishing pipe.

In this embodiment, the battery may include the multiple battery cells, and the battery cell is provided with the pressure relief mechanism. The pressure relief mechanism can be actuated when internal temperature or pressure of the battery cell exceeds the threshold, to relieve the internal pressure. The fire-extinguishing pipe is provided at a position corresponding to the pressure relief mechanism, and when the pressure relief mechanism is actuated, the emissions from the pressure relief mechanism can destroy the fire-extinguishing pipe so that the fire-extinguishing medium accommodated in the fire-extinguishing pipe flows out to the pressure relief mechanism to cool down the battery cell. In addition, the fire-extinguishing pipe is fastened to the surface of the restraining member facing toward the fire-extinguishing pipe via the fastener. This can prevent the fire-extinguishing pipe from being blown off when the pressure relief mechanism of the battery cell located at an end is actuated, while such blow-off makes it impossible for the fire-extinguishing medium released to enter the battery cell at the end. Therefore, the battery cell at the end can get timely fire-extinguishing, improving the safety performance of batteries.

In a possible implementation, the fastener includes a limiting structure and a connecting structure, where the limiting structure is configured to limit the fire-extinguishing pipe, and the connecting structure is configured to be fixedly connected to the restraining member.

In this embodiment, the limiting structure limits the fire-extinguishing pipe and the connecting structure fastens the fire-extinguishing pipe to the surface of the restraining member facing toward the fire-extinguishing pipe, so that position change of the fire-extinguishing pipe can be avoided when an electric apparatus (such as an electric vehicle) on which the battery is located is in motion. In addition, this can prevent the fire-extinguishing pipe from being blown off when the pressure relief mechanism of the battery cell located at an end is actuated, while such blow-off makes it impossible for the fire-extinguishing medium released to enter the battery cell at the end. Therefore, the battery at the end can get timely fire-extinguishing when thermal runaway occurs on the battery, improving the safety performance of batteries.

In a possible implementation, the limiting structure includes a first limiting portion and a second limiting portion that fit with each other, where the first limiting portion and the second limiting portion together form a through hole in the first direction, and the fire-extinguishing pipe is configured to pass through the through hole and abut against an inner wall of the through hole, so that the fire-extinguishing pipe is limited.

In this embodiment, with the fire-extinguishing pipe disposed inside the through hole, limitation of the fire-extinguishing pipe can be implemented, especially limitation of the fire-extinguishing pipe in a third direction, and blow-off of the fire-extinguishing pipe can be prevented when the pressure relief mechanism of the battery cell is actuated, where the third direction is perpendicular to the first direction. In addition, since the first limiting portion and the second limiting portion forming the through hole fit with each other, the mounting and dismounting of the fire-extinguishing pipe are facilitated.

In a possible implementation, the first limiting portion includes a first recess, where an opening of the first recess faces toward the battery cell, and a first buckle is provided on a side wall of the first recess; the second limiting portion includes a second recess, where an opening of the second recess is disposed facing away from the battery cell, and a second buckle is provided on a side wall of the second recess; the first recess and the second recess are disposed opposite each other to form the through hole; and the first buckle and the second buckle mate with each other to implement fitting of the first limiting portion and the second limiting portion.

In this embodiment, with the first recess of the first limiting portion and the second recess of the second limiting portion disposed opposite each other to form the through hole for accommodating the fire-extinguishing pipe, the fire-extinguishing pipe can be limited, and blow-off of the fire-extinguishing pipe can be prevented when the pressure relief mechanism of the battery cell is actuated. In addition, with the first buckle and the second buckle disposed on the side walls of the first recess and the second recess, the first limiting portion and the second limiting portion can fit with each other, thereby facilitating mounting and dismounting of the fire-extinguishing pipe.

In a possible implementation, the first buckle and the second buckle include corresponding inclined surfaces, where the inclined surfaces are configured to guide the first buckle and the second buckle to mate with each other.

In this embodiment, the inclined surface of the first buckle and the inclined surface of the second buckle can guide the first buckle and the second buckle to mate with each other, facilitating fitting between the first limiting portion and the second limiting portion.

In a possible implementation, a first end of the first limiting portion is integrally connected to the second limiting portion, a second end of the first limiting portion fits with the second limiting portion, and the first limiting portion is configured to be capable of bending at a joint between the first end and the second limiting portion.

In this embodiment, the first limiting portion and the second limiting portion are integrally connected on one end and fitted with each other on the other end. This can facilitate mounting and dismounting and improve the structural stability of the fastener.

In a possible implementation, the limiting structure further includes a third limiting portion, where the third limiting portion is configured to limit a position of the fire-extinguishing pipe in the first direction.

In this embodiment, with the third limiting portion added to the limiting structure, the fire-extinguishing pipe can be limited in the first direction, thereby further increasing the mounting stability of the fire-extinguishing pipe, and thus overcoming the problem of untimely fire-extinguishing caused by the position change of the fire-extinguishing pipe when thermal runaway occurs.

In a possible implementation, the third limiting portion includes a support portion and a blocking portion that are connected, where the support portion is configured to support an end of the fire-extinguishing pipe, and the blocking portion is configured to block movement of the fire-extinguishing pipe along the first direction.

In this embodiment, using the support portion to support the end of the fire-extinguishing pipe can prevent the end of the fire-extinguishing pipe from shaking along the third direction. Using the blocking portion to block movement of the fire-extinguishing pipe along the first direction can prevent the fire-extinguishing pipe from shaking along the first direction. Therefore, the use of the third limiting portion formed by the support portion and the blocking portion can improve the mounting stability of the fire-extinguishing pipe, thereby improving the safety performance of batteries.

In a possible implementation, the fastener further includes elastic sheet(s) attached to an inner wall of the through hole, where the elastic sheet is configured to implement an interference fit between the fire-extinguishing pipe and the through hole.

In this embodiment, since the thickness of the fire-extinguishing pipe may change under different working conditions, providing the elastic sheet(s) on the inner wall of the through hole for accommodating the fire-extinguishing pipe can absorb shock when the fire-extinguishing pipe expands, thereby preventing the fire-extinguishing pipe from driving the first limiting portion to move when the fire-extinguishing pipe expands, thus ensuring the fixing effect of the fastener.

In a possible implementation, the elastic sheet is an arc-shaped structure, and both ends of the elastic sheet are connected to the inner wall of the through hole; or one end of the elastic sheet is connected to the inner wall of the through hole, and the other end of the elastic sheet is disposed apart from the inner wall of the through hole.

For example, the elastic sheet is a semicircular structure or fin-shaped structure.

In this embodiment, the elastic sheet of the semicircular structure is simple in structure and easy to implement. The elastic sheet of the fin-shaped structure has a small contact area with the fire-extinguishing pipe and is subjected to less force, and therefore is unlikely to drive the first limiting portion to move when the fire-extinguishing pipe expands, thus further guaranteeing the fastening effect of the fastener.

In a possible implementation, the elastic sheets are provided on a top wall and/or a bottom wall of the through hole, and the elastic sheets are provided symmetrically.

In this embodiment, providing the elastic sheets on the top wall and/or bottom wall of the through hole prevents the fire-extinguishing pipe from driving the first limiting portion to move when the fire-extinguishing pipe expands in the third direction, thus guaranteeing the fastening effect of the fastener. In addition, providing the elastic sheets symmetrically can make two ends of the fire-extinguishing pipe located in the through hole in the second direction receive balanced force when the fire-extinguishing pipe expands, thereby better guaranteeing the fastening effect of the fastener. The second direction is perpendicular to the first direction and the third direction.

In a possible implementation, the connecting structure fits with the restraining member; or the connecting structure is fixedly connected to the restraining member via fixing members.

A second aspect provides an electric apparatus including the battery according to the first aspect, where the battery is configured to supply electric energy to the electric apparatus.

A third aspect provides a method for preparing a battery including: providing multiple battery cells, where the multiple battery cells are arranged in a first direction, where the battery cell is provided with a pressure relief mechanism, the pressure relief mechanism being configured to be actuated when internal pressure or temperature of the battery cell reaches a threshold, to relieve the internal pressure; providing a fire-extinguishing pipe configured to accommodate a fire-extinguishing medium, where the fire-extinguishing pipe is configured to release the fire-extinguishing medium during actuation of the pressure relief mechanism; providing a restraining member disposed at an end of the multiple battery cells along the first direction, where the restraining member is configured to restrain the multiple battery cells in the first direction; and providing a fastener attached to a surface of the restraining member facing toward the fire-extinguishing pipe, where the fastener is configured to fasten the fire-extinguishing pipe.

A fourth aspect provides an apparatus for preparing a battery including a providing module configured to: provide multiple battery cells, where the multiple battery cells are arranged in a first direction, where the battery cell is provided with a pressure relief mechanism, the pressure relief mechanism being configured to be actuated when internal pressure or temperature of the battery cell reaches a threshold, to relieve the internal pressure; provide a fire-extinguishing pipe configured to accommodate a fire-extinguishing medium, where the fire-extinguishing pipe is configured to release the fire-extinguishing medium during actuation of the pressure relief mechanism; provide a restraining member disposed at an end of the multiple battery cells along the first direction, where the restraining member is configured to restrain the multiple battery cells in the first direction; and provide a fastener attached to a surface of the restraining member facing toward the fire-extinguishing pipe, where the fastener is configured to fasten the fire-extinguishing pipe.

Based on the foregoing technical solutions, the battery may include the multiple battery cells, and the battery cell is provided with the pressure relief mechanism. The pressure relief mechanism can be actuated when internal temperature or pressure of the battery cell exceeds the threshold, to relieve the internal pressure. The fire-extinguishing pipe is provided at a position corresponding to the pressure relief mechanism, and when the pressure relief mechanism is actuated, the emissions from the pressure relief mechanism can destroy the fire-extinguishing pipe so that the fire-extinguishing medium accommodated in the fire-extinguishing pipe flows out to the pressure relief mechanism to cool down the battery cell. In addition, the fire-extinguishing pipe is fastened to the surface of the restraining member facing toward the fire-extinguishing pipe via the fastener. This can prevent the fire-extinguishing pipe from being blown off when the pressure relief mechanism of the battery cell located at an end is actuated, while such blow-off makes it impossible for the fire-extinguishing medium released to enter the battery cell at the end. Therefore, the battery cell at the end can get timely fire-extinguishing, improving the safety performance of batteries.

BRIEF DESCRIPTION OF DRAWINGS

To describe the technical solutions of the embodiments of this application more clearly, the following briefly describes the accompanying drawings required for describing the embodiments of this application. Apparently, the accompanying drawings described below show merely some embodiments of this application, and persons of ordinary skill in the art may still derive other drawings from the accompanying drawings without creative efforts.

Figure 1:
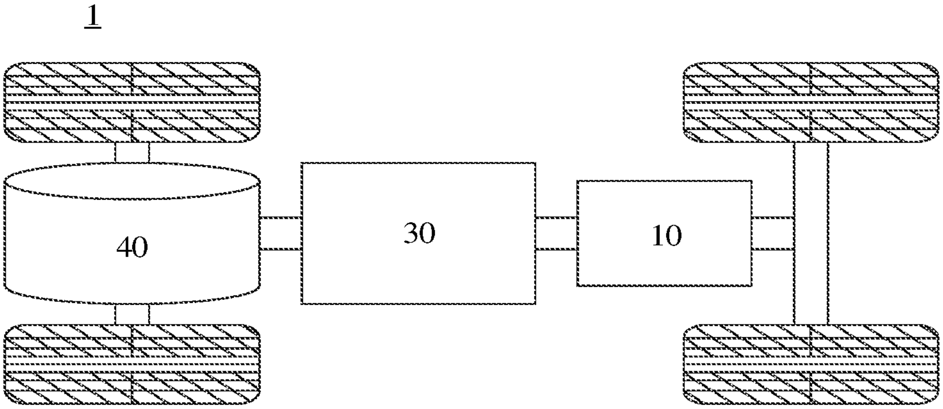
FIG. 1 is a schematic structural diagram of a vehicle according to an embodiment of this application.

The accompanying drawings are not necessarily drawn to scale.

DESCRIPTION OF EMBODIMENTS

The following further describes the implementations of this application in detail with reference to the accompanying drawings and embodiments. The detailed description of embodiments and the accompanying drawings are intended to illustrate the principle of this application, rather than to limit the scope of this application, meaning this application is not limited to the embodiments described herein.

In the description of this application, it should be noted that, unless otherwise stated, "multiple" means at least two; and the orientations or positional relationships indicated by the terms "upper", "lower", "left", "right", "inside", "outside", and the like are merely for ease and brevity of description of this application rather than indicating or implying that the means or components mentioned must have specific orientations or must be constructed or manipulated according to particular orientations. These terms shall therefore not be construed as limitations on this application. In addition, the terms "first", "second", "third", and the like are merely for the purpose of description and shall not be understood as any indication or implication of relative importance. "Perpendicular" is not perpendicular in the strict sense but within an allowable range of error. "Parallel" is not parallel in the strict sense but within an allowable range of error.

The orientation terms appearing in the following description all are directions shown in the figures, and do not limit the specific structure of this application. In the description of this application, it should also be noted that unless otherwise specified and defined explicitly, the terms "mount", "connect", and "join" should be understood in their general senses. For example, they may refer to a fixed connection, a detachable connection, or an integral connection, and may refer to a direct connection or an indirect connection via an intermediate medium. Persons of ordinary skill in the art can understand specific meanings of these terms in this application as appropriate to specific situations.

The battery in this application is a single physical module that includes one or more battery cells for providing electric power. For example, the battery mentioned in this application may include a battery module, a battery pack, or the like. A battery typically includes a box configured to enclose one or more battery cells. The box can prevent liquids or other foreign matter from affecting charging or discharging of the battery cell.

Optionally, the battery cell may include a lithium ion secondary battery, a lithium ion primary battery, a lithiumsulfur battery, a sodium/lithium-ion battery, a sodium ion battery, a magnesium ion battery, or the like. This is not limited in the embodiments of this application. The battery cell may be cylindrical, flat, cuboid, or of other shapes, which is not limited in the embodiments of this application either. Battery cells are typically divided into three types by packaging method: cylindrical cell, prismatic cell, and pouch cell. This is not limited in the embodiments of this application either.

The battery cell includes an electrode assembly and an electrolyte. The electrode assembly includes a positive electrode plate, a negative electrode plate, and a separator. The battery cell mainly relies on movement of metal ions between a positive electrode plate and a negative electrode plate to work. The positive electrode plate includes a positive electrode current collector and a positive electrode active substance layer. The positive electrode active substance layer is coated on a surface of the positive electrode current collector, and a current collector uncoated with the positive electrode active substance layer protrudes from the current collector coated with the positive electrode active substance layer and serves as a positive tab. A lithium-ion battery is used as an example, for which, the positive electrode current collector may be made of aluminum and the positive electrode active substance may be lithium cobaltate, lithium iron phosphate, ternary lithium, lithium manganate, or the like. The negative electrode plate includes a negative electrode current collector and a negative electrode active substance layer. The negative electrode active substance layer is coated on a surface of the negative electrode current collector. A current collector uncoated with the negative electrode active substance layer protrudes from the current collector coated with the negative electrode active substance layer and serves as a negative tab. The negative electrode current collector may be made of copper, and the negative electrode active substance may be carbon, silicon, or the like. To allow a large current to pass through without any fusing, multiple positive tabs are provided and stacked together, and multiple negative tabs are provided and stacked together. A material of the separator may be polypropylene (Polypropylene, PP), polyethylene (Polyethylene, PE), or the like. In addition, the electrode assembly may be a wound structure or a stacked structure, but the embodiments of this application are not limited thereto.

For the development of battery technologies, many design factors need to be considered, for example, performance parameters such as energy density, cycle life, discharge capacity, and charge and discharge rate, as well as safety of the battery.

For battery cells, safety hazards mainly originate in charging and discharging. Therefore, in order to improve the safety performance of batteries, a pressure relief mechanism is often provided for battery cells. The pressure relief mechanism is an element or part that is actuated when internal pressure or temperature of the battery cell reaches a predetermined threshold, so as to relieve the internal pressure or temperature. The predetermined threshold may be adjusted according to different design requirements. The predetermined threshold may depend on the material used for one or more of the positive electrode plate, negative electrode plate, electrolyte, and separator in the battery cell. The pressure relief mechanism may employ an element or part sensitive to pressure or temperature such that the pressure relief mechanism is actuated when the internal pressure or temperature of the battery cell reaches the predetermined threshold, thereby forming a channel for relieving the internal pressure or temperature.

"Actuate" mentioned in this application means that the pressure relief mechanism is put into action such that the internal pressure and temperature of the battery cell is relieved. The action that the pressure relief mechanism is put into may include but is not limited to, for example, cracking, tearing, or melting at least part of the pressure relief mechanism. When the pressure relief mechanism is actuated, high-pressure and high-temperature substances inside the battery cell are discharged from the pressure relief mechanism as emissions. In this way, the battery cell can relieve its pressure under controllable pressure or temperature, thereby avoiding more serious potential incidents.

The emissions from the battery cell mentioned in this application include but are not limited to: electrolyte, fragments of positive and negative electrode plates and separator resulting from dissolution or breaking, high-temperature and high-pressure gases and flames produced by reactions, and the like.

The pressure relief mechanism in the battery cell greatly influences the safety of the battery. For example, when the battery cell is short-circuited or overcharged, thermal runaway may be caused inside the battery cell, resulting in a sudden rise in pressure or temperature. In this case, the pressure relief mechanism can be actuated to make the internal pressure and temperature discharge to the outside, thus preventing the battery cell from exploding and catching fire.

The current design of the pressure relief mechanism mainly focuses on release of the high pressure and heat inside the battery cell, to be specific, releasing the emissions to the outside of the battery cell. The high-temperature and high-pressure emissions are discharged toward a side of battery cell at which the pressure relief mechanism is provided, and more specifically, may be discharged toward a zone at which the pressure relief mechanism is actuated. The force and destructive power of such emissions may be great, and may even be enough to break through one or more structures in that direction.

In view of this, the embodiments of this application provide a technical solution in which a fire-extinguishing pipe is provided at a position corresponding to a pressure relief mechanism of a battery cell, and emissions released from the battery cell during the actuation of the pressure relief mechanism pass through and break the fire-extinguishing pipe, so that the fire-extinguishing medium in the fire-extinguishing pipe can be released from the place at which the fire-extinguishing pipe is broken, and the emissions from the pressure relief mechanism is cooled down so as to reduce the hazard of the emissions, thereby enhancing the safety of batteries.

The fire-extinguishing pipe in this embodiment of this application is configured to accommodate a fire-extinguishing medium, where the fire-extinguishing medium herein may be a fluid, and the fluid may be liquid or gas. When the pressure relief mechanism does not break the fire-extinguishing pipe, the fire-extinguishing pipe may accommodate no substances. When the pressure relief mechanism is actuated, the fire-extinguishing pipe accommodates the fire-extinguishing medium. For example, a valve may be switched on or off to control the fire-extinguishing medium to enter the fire-extinguishing pipe. Alternatively, when the pressure relief mechanism is not broken, the fire-extinguishing pipe may always accommodate the fire-extinguishing medium, and the fire-extinguishing medium may further be used for adjusting temperature of the battery cell. Adjusting temperature refers to heating or cooling the multiple battery cells. In a case of cooling or lowering temperature of the battery cells, the fire-extinguishing pipe is configured to accommodate cooling fluid to lower temperature of the multiple battery cells. In this case, the fire-extinguishing pipe may also be referred to as a cooling component, a cooling system, a cooling pipe, or the like, and the fire-extinguishing medium accommodated therein may also be referred to as a cooling medium or cooling fluid, and more specifically, cooling liquid or cooling gas. Optionally, the fire-extinguishing medium may circulate, to implement a better temperature adjustment effect. Optionally, the fire-extinguishing medium may be water, mixed liquid of water and glycol, air, or the like.

Although the fire-extinguishing pipe is provided, the battery still faces a problem of untimely fire-extinguishing when thermal runaway occurs. The main reason is that the position of the fire-extinguishing pipe changes when the thermal runaway occurs on the battery, which in turn makes it impossible for the fire-extinguishing pipe to provide timely fire-extinguishing to the thermal runaway part, that is, the fire-extinguishing pipe is not firmly fastened.

In some related technologies, the fire-extinguishing pipe is mounted with a bracket on a wall where the pressure relief mechanism in the battery cell is located. For example, the bracket is mounted on the wall where the pressure relief mechanism in the battery cell is located, and the fire-extinguishing pipe is disposed on the bracket and facing the pressure relief mechanism. However, in this technical solution, the fire-extinguishing pipe is still blown off when the pressure relief mechanism of the battery cell at an end is actuated, making it impossible for the fire-extinguishing medium released to enter the interior of the battery cell at the end, thereby affecting the safety of the battery to some extent.

In view of this, this application provides a battery in which a fire-extinguishing pipe is fastened to a surface of a restraining member at an end of the battery cell via a fastener, to prevent the fire-extinguishing pipe above the pressure relief mechanism from being blown off when the pressure relief mechanism of the battery cell at the end is actuated. In this way, the fire-extinguishing medium can enter the interior of the battery cell at the end, that is, the battery cell at the end can get timely fire-extinguishing, thus improving the safety performance of batteries.

The technical solutions described in the embodiments of this application are applicable to various apparatuses that use batteries, for example, mobile phones, portable devices, notebook computers, electric bicycles, electric toys, electric tools, electric vehicles, ships, and spacecrafts. For example, spacecrafts include airplanes, rockets, space shuttles, and spaceships.

It should be understood that the technical solutions described in the embodiments of this application are applicable to not only the apparatuses described above but also all apparatuses using batteries. However, for brevity of description, in the following embodiments, an electric vehicle is used as an example for description.

For example, FIG. 1 is a schematic structural diagram of a vehicle 1 according to an embodiment of this application. The vehicle 1 may be a fossil fuel vehicle, a natural-gas vehicle, or a new energy vehicle, where the new energy vehicle may be a battery electric vehicle, a hybrid electric vehicle, a range-extended vehicle, or the like. A motor 40, a controller 30, and a battery 10 may be provided inside the vehicle 1, where the controller 30 is configured to control the battery to supply power to the motor 40. For example, the battery 10 may be disposed at the bottom, front, or rear of the vehicle 1. The battery 10 may be configured to supply power to the vehicle 1. For example, the battery 10 may be used as an operational power source for the vehicle 1 which is configured for a circuit system of the vehicle 1, for example, to satisfy power needs of start, navigation, and running of the vehicle 1. In another embodiment of this application, the battery 10 can be used not only as the operational power source for the vehicle 1, but also as a driving power source for the vehicle 1, replacing or partially replacing fossil fuel or natural gas to provide driving traction for the vehicle 1.

To meet different power usage requirements, the battery 10 may include multiple battery cells, and the multiple battery cells may be connected in series, parallel, or series-parallel, where being connected in series-parallel means a combination of series and parallel connections. The battery may also be called a battery pack. Optionally, multiple battery cells may be connected in series, parallel, or series-parallel to form a battery module first, and then multiple battery modules are connected in series, parallel, or series-parallel to form a battery. In a word, the multiple battery cells may be directly combined into a battery, or may first be combined into battery modules which are then combined into a battery.

Figure 2:
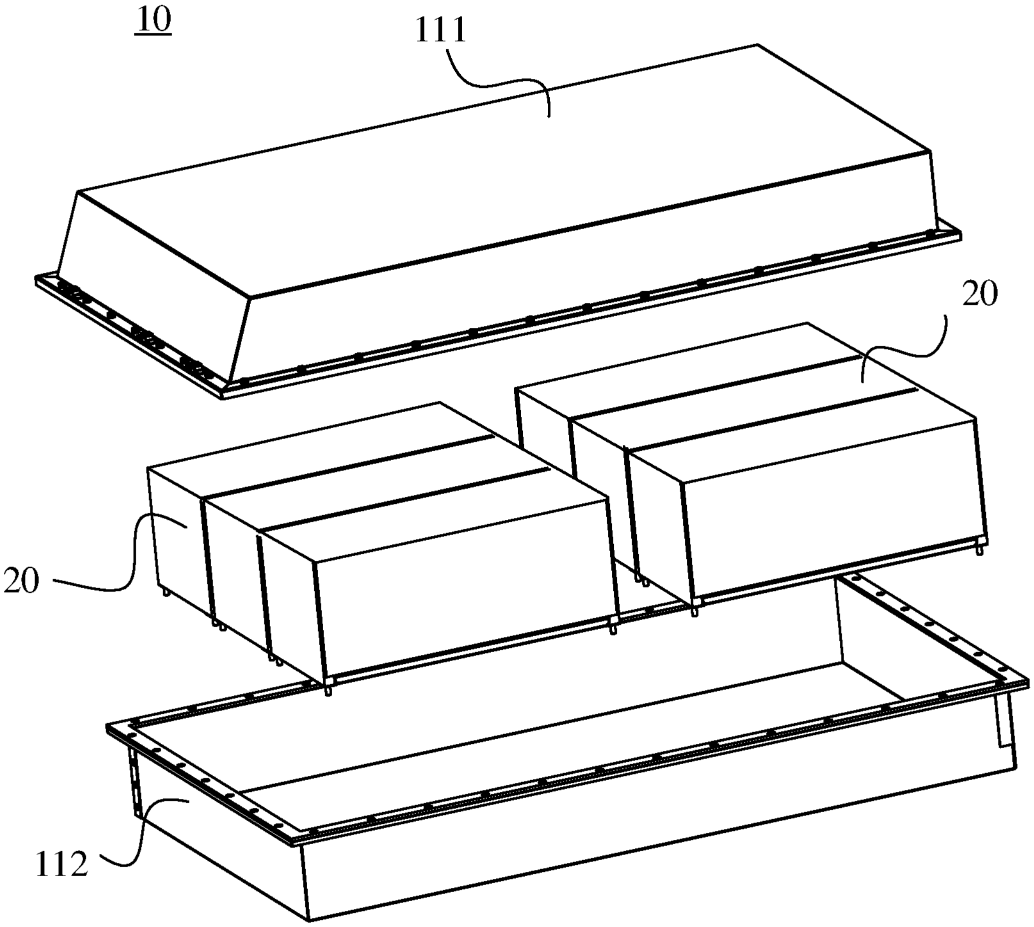
FIG. 2 is a schematic structural exploded view of a battery according to an embodiment of this application.

For example, FIG. 2 is a schematic structural diagram of a battery 10 according to an embodiment of this application. The battery 10 may include multiple battery cells 20. The battery 10 may further include a box (or a cover body) that has a hollow structure inside, and the multiple battery cells 20 are accommodated in the box. As shown in FIG. 2, the box may include two portions that are referred to herein as a first portion 111 and a second portion 112 respectively. The first part 111 and the second part 112 are fitted together. Shapes of the first portion 111 and the second portion 112 may be determined based on a shape in which the multiple battery cells 20 are combined, and the first portion 111 and the second portion 112 each may have an opening. For example, both the first portion 111 and the second portion 112 may be hollow cuboids and each has only one face as an opening face. The opening of the first portion 111 and the opening of the second portion 112 are disposed opposite each other, and the first portion 111 and the second portion 112 are snap-fitted to form the box with a closed chamber. The multiple battery cells 20 are connected in parallel, series, or series-parallel, and then placed into the box formed by the first portion 111 and the second portion 112 that are snap-fitted.

Optionally, the box may include two end plates, two side plates, a bottom plate, and a top cover plate, where the two end plates and two side plates enclose a chamber with two openings, and the top cover plate and the bottom plate respectively cover the two openings to form a box with a closed chamber.

Optionally, the battery 10 may further include other structures. Details are not described herein. For example, the battery 10 may further include a busbar, where the busbar is configured to implement an electrical connection between multiple battery cells 20, for example, a parallel connection, a series connection, or a series and parallel connection. Specifically, the busbar may implement the electrical connection between the battery cells 20 by connecting electrode terminals of the battery cells 20. Further, the busbar may be fixed to the electrode terminal of the battery cell by welding. Electric energy of the multiple battery cells 20 can be further drawn out of the box through a conductive mechanism. Optionally, the conductive mechanism may also belong to the busbar.

Based on different power demands, battery cells 20 can be set in any quantity. Multiple battery cells 20 may be connected in series, in parallel, or in series and parallel to achieve greater capacity or power. Because the quantity of battery cells 20 included in each battery 10 may be large, for ease of installation, the battery cells 20 may be arranged in groups, and each group of battery cells 20 forms a battery module. The quantity of battery cells 20 included in the battery module is not limited, and may be set according to requirements.

Figure 3:
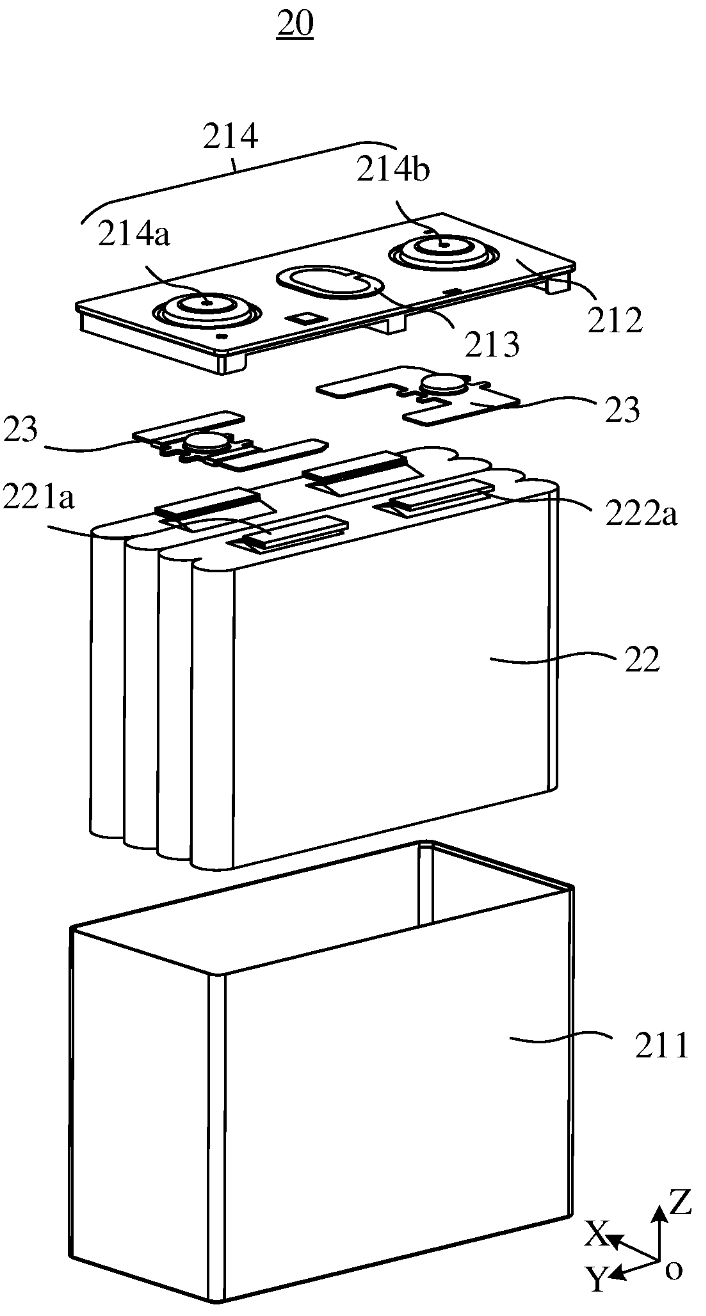
FIG. 3 is a schematic structural diagram of a battery cell according to an embodiment of this application.

FIG. 3 is a schematic structural diagram of a battery cell 20 according to an embodiment of this application.

As shown in FIG. 3, the battery cell 20 includes one or more electrode assemblies 22, a housing 211, and a cover plate 212. A wall of the housing 211 and the cover plate 212 each are referred to as a wall of the battery cell 20. The housing 211 depends on a combined shape of the one or more electrode assemblies 22. For example, the housing 211 may be a hollow cuboid, a cube, or a cylinder, and one surface of the housing 211 has an opening for placing the one or more electrode assemblies 22 into the housing 211. For example, when the housing 211 is a hollow cuboid or cube, one face of the housing 211 is an opening face, which means that the face has no wall so that the inside and the outside of the housing 211 are communicated. When the housing 211 is a hollow cylinder, the end face of the housing 211 is an opening face, which means that the end face has no wall so that the inside and the outside of the housing 211 are communicated. The cover plate 212 covers the opening and is connected to the housing 211 to form an enclosed cavity of the electrode assembly 22. The housing 211 is filled with an electrolyte such as a liquid electrolyte.

The battery cell 20 may also include two electrode terminals 214 that may be disposed on the cover plate 212. The cover plate 212 is generally in a shape of a flat plate, and two electrode terminals 214 are fixed on a flat surface of the cover plate 212. The two electrode terminals 214 are a positive electrode terminal 214*a* and a negative electrode terminal 214*b* respectively. Each electrode terminal 214 is correspondingly provided with a connecting member 23, or a current collecting member that is located between the cover plate 212 and the electrode assembly 22 for electrically connecting the electrode assembly 22 and the electrode terminal 214.

As shown in FIG. 3, each electrode assembly 22 has a first tab 221*a* and a second tab 222*a*. The first tab 221*a* and the second tab 222*a* have opposite polarities. For example, when the first tab 221*a* is a positive tab, the second tab 222*a* is a negative tab. The first tabs 221*a* of the one or more electrode assemblies 22 are connected to one electrode terminal through one connecting member 23, and the second tabs 222*a* of the one or more electrode assemblies 22 are connected to the other electrode terminal through the other connecting member 23. For example, the positive electrode terminal 214*a* is connected to the positive tab through one connecting member 23, and the negative electrode terminal 214*b* is connected to the negative tab through the other connecting member 23.

In the battery cell 20, one or more electrode assemblies 22 may be provided depending on an actual need. As shown in FIG. 3, the battery cell 20 is provided with four independent electrode assemblies 22.

In an example, a pressure relief mechanism 213 may be further provided on one of the walls of the battery cell 20. The pressure relief mechanism 213 is configured to be actuated when the internal pressure or temperature of the battery cell 20 reaches a threshold, to relieve the internal pressure or temperature.

Optionally, in another embodiment of this application, the pressure relief mechanism 213 and the electrode terminal 214 are disposed on the same wall of the battery cell 20. For example, as shown in FIG. 3, both the electrode terminal 214 and the pressure relief mechanism 213 can be provided on the top wall, which is the cover plate 212, of the battery cell 20.

The pressure relief mechanism 213 and the electrode terminal 214 being disposed on the same wall of the battery cell 20, for example, on the cover plate 212 of the battery cell 20, can facilitate the processing and installation of the pressure relief mechanism 213 and the electrode terminal 214, and is conducive to improving the production efficiency of the battery 10.

Optionally, in an embodiment of this application, the pressure relief mechanism 213 and the electrode terminal 214 are disposed on different walls of the battery cell 20. For example, the electrode terminal 214 of the battery cell 20 may be provided on the top wall, which is the cover plate 212, of the battery cell 20. The pressure relief mechanism 213 is disposed on another wall of the battery cell 20 that is different from the top wall. For example, the pressure relief mechanism 213 is disposed on a bottom wall opposite the top wall.

The pressure relief mechanism 213 may be part of the wall on which it is located, or may be a separate structure from the wall on which it is located and be fixed to the wall on which it is located by, for example, welding. For example, in the embodiment shown in FIG. 3, when the pressure relief mechanism 213 is a part of the bottom wall, the pressure relief mechanism 213 may be formed by providing an indentation on the bottom wall. A thickness of the bottom wall corresponding to the indentation is less than a thickness of other regions of the pressure relief mechanism 213 other than at the indentation. The indentation is the weakest position of the pressure relief mechanism 213. When the gas generated by the battery cell 20 is too much such that the internal pressure of the housing 211 rises and reaches the threshold or the internal temperature of the battery cell 20 rises and reaches the threshold due to the heat generated by the reaction inside the battery cell 20, the pressure relief mechanism 213 may split at the indentation and cause the inside and outside of the housing 211 to be connected, and the gas pressure and temperature are released to the outside through the splitting of the pressure relief mechanism 213, thus preventing the battery cell 20 from exploding.

In addition, the pressure relief mechanism 213 may be any possible pressure relief mechanism. This is not limited in the embodiments of this application. For example, the pressure relief mechanism 213 may be a temperature-sensitive pressure relief mechanism, where the temperature-sensitive pressure relief mechanism is configured to be melted when the internal temperature of the battery cell 20 provided with the pressure relief mechanism 213 reaches a threshold; and/or the pressure relief mechanism 213 may be a pressure-sensitive pressure relief mechanism, where the pressure-sensitive pressure relief mechanism is configured to be split when the internal gas pressure of the battery cell 20 provided with the pressure relief mechanism 213 reaches a threshold.

Figure 4:
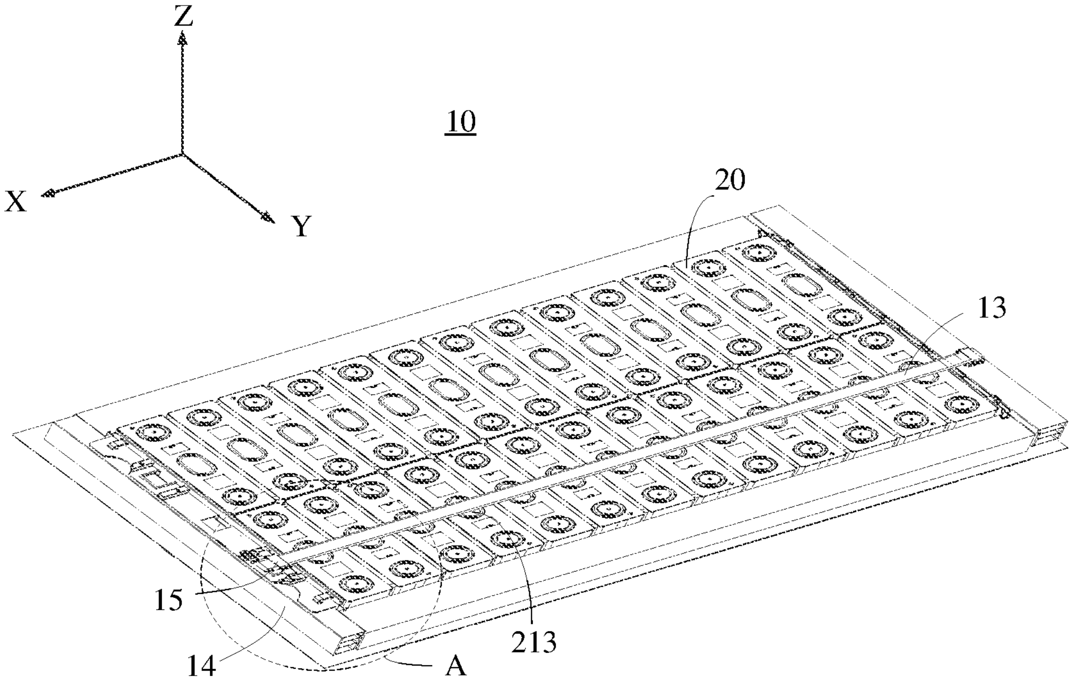
FIG. 4 is a schematic structural diagram of a battery according to an embodiment of this application.

FIG. 4 is a schematic structural diagram of a battery 10 according to an embodiment of this application. As shown in FIG. 4, the battery 10 includes multiple battery cells 20 arranged along a first direction X, each battery cell 20 including a pressure relief mechanism 213, and the pressure relief mechanism 213 is configured to be actuated when internal pressure or temperature of the battery cell 20 reaches a threshold, to relieve the internal pressure.

Optionally, the pressure relief mechanism 213 may be provided at any position of the battery cell 20. Assuming that the battery cell 20 is a cuboid as shown in FIG. 4, the pressure relief mechanism 213 may be provided on any one of the walls of the cuboid. For example, the pressure relief mechanism 213 may be provided on the topmost wall of each battery cell 20 as shown in FIG. 4, that is, the pressure relief mechanism 213 and an electrode terminal 214 of the battery cell may be provided on the same wall. For ease of description, an example of a structure in which the pressure relief mechanism 213 and the electrode terminal 214 of the battery cell 20 are provided on the same wall is used for description in all embodiments of this application.

Further, the battery 10 further includes a restraining member 14 provided at an end of the multiple battery cells 20 along the first direction X. The restraining member 14 is configured to restrain the multiple battery cells 20 in the first direction X.

Optionally, the battery 10 may include a box, the box being configured to accommodate the multiple battery cells 20. The box may include a restraining member 14 disposed in the first direction X. That is, the restraining member 14 may be perpendicular to the first direction X. For example, the restraining member 14 may be an end plate and/or a parting beam of the battery 10, where the end plate is provided at both ends of the battery 10 in the first direction X and the parting beam is provided between the two end plates and separates the box into multiple accommodating cavities. Further, the box may further include two side plates configured to restrain the multiple battery cells 20 in a second direction Y, the second direction Y being perpendicular to the first direction X. The two side plates and the two end plates are sequentially connected end to end to enclose a cavity for accommodating the multiple battery cells 20.

As shown in FIG. 4, the battery 10 may further include a fire-extinguishing pipe 13 configured to accommodate a fire-extinguishing medium, where the fire-extinguishing pipe 13 is configured to release the accommodated fire-extinguishing medium when the pressure relief mechanism 213 is actuated, and the fire-extinguishing medium can be used for quick cooling down. It should be understood that a position of the fire-extinguishing pipe 13 in this embodiment of this application is related to a position of the pressure relief mechanism 213. In other words, the fire-extinguishing pipe 13 is provided at a position corresponding to the pressure relief mechanism 213. For example, as shown in FIG. 4, the fire-extinguishing pipe 13 is provided above the wall of the battery cell 20 where the pressure relief mechanism 213 is located and directly faces the pressure relief mechanism 213. The fire-extinguishing pipe 13 may at least partially cover the pressure relief mechanism 213 so that when the pressure relief mechanism 213 is actuated, ejected emissions can destroy the fire-extinguishing pipe 13, thereby allowing the fire-extinguishing medium in the fire-extinguishing pipe 13 to flow to the thermal runaway battery cell 20 via the pressure relief mechanism 213.

It should be noted that in this embodiment of this application, the first direction X is substantially an extending direction of the fire-extinguishing pipe 13.

Alternatively, the battery 10 in this embodiment of this application may further include a fastener 15 attached to a surface of the restraining member 14 facing toward the fire-extinguishing pipe 13, and the fastener 15 is configured to fasten the fire-extinguishing pipe 13.

Figure 5:
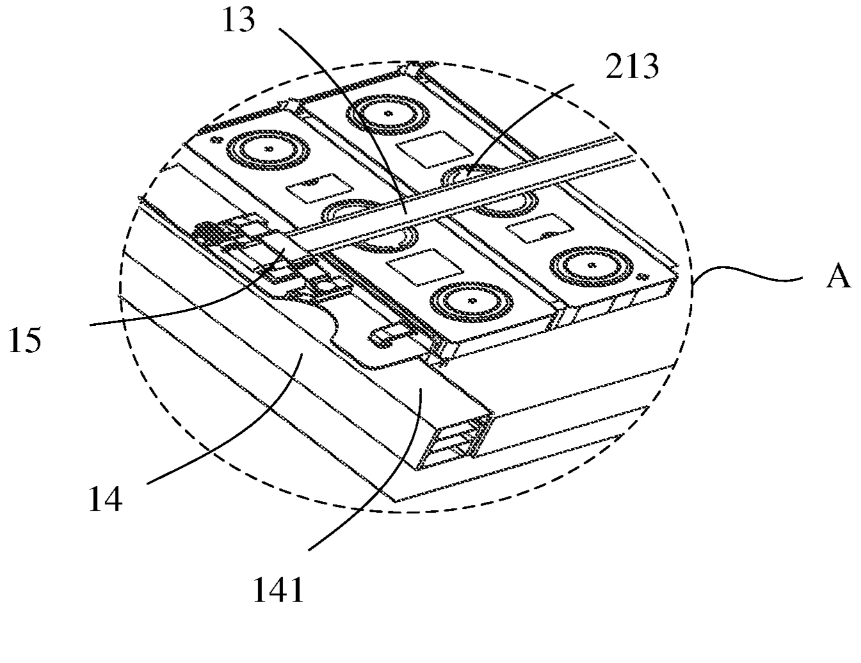
FIG. 5 is a locally enlarged schematic diagram of part A in FIG. 4.

Specifically, FIG. 5 is a locally enlarged diagram of part A in FIG. 4. As shown in FIG. 5, the restraining member 14 includes a first surface 141. Optionally, the first surface 141 is parallel to the wall on which the pressure relief mechanism 213 of the battery cell 20 is located. The first surface 141 faces toward the fire-extinguishing pipe 13, and the fire-extinguishing pipe 13 is fastened to the first surface 141 via the fastener 15.

Therefore, the battery 10 in this embodiment of this application may include the multiple battery cells 20, and the battery cell 20 is provided with the pressure relief mechanism 213. The pressure relief mechanism 213 can be actuated when internal temperature or pressure of the battery cell 20 exceeds the threshold, to relieve the internal pressure. The fire-extinguishing pipe 13 is provided at a position corresponding to the pressure relief mechanism 213, and when the pressure relief mechanism 213 is actuated, the emissions from the pressure relief mechanism 213 can destroy the fire-extinguishing pipe 13 so that the fire-extinguishing medium accommodated in the fire-extinguishing pipe 13 flows out to the pressure relief mechanism 213 to cool down the battery cell 20. In addition, the fire-extinguishing pipe 13 is fastened to the first surface 141 of the restraining member 14 facing toward the fire-extinguishing pipe 13 via the fastener 15. This can prevent the fire-extinguishing pipe 13 from being blown off when the pressure relief mechanism 213 of the battery cell 20 located at an end is actuated, while such blow-off makes it impossible for the fire-extinguishing medium released to enter the battery cell 20 at the end. Therefore, the battery cell 20 at the end can get timely fire-extinguishing, improving the safety performance of batteries 10.

It should be understood that in a case that the battery 10 includes a large number of battery cells 20, the multiple battery cells 20 may be arranged in an array. For example, the battery shown in FIG. 4 includes 2*13 battery cells 20. That is, 13 battery cells are arranged along the first direction X and 2 battery cells are arranged along the second direction Y. Accordingly, the fire-extinguishing pipe 13 provided above the battery cell 20 can be disposed in a corresponding shape. For example, for any row of battery cells 20 arranged along the first direction X in the battery 10, the fire-extinguishing pipe 13 may be disposed in a linear communicating pipe above the battery cells 20 and controlled by a set of valves. For another example, for any two adjacent rows of battery cells 20 arranged along the first direction X in the battery 10, the fire-extinguishing pipe 13 may be provided as a U-shaped communicating pipe with one bend and is controlled by a set of valves, to save space and facilitate control. Similarly, for any three adjacent rows of battery cells 20 arranged along the first direction X of the battery 10, the fire-extinguishing pipe 13 may alternatively be provided as an S-shaped connecting pipe with two bends and is controlled by a set of valves. By analogy, for any more than three adjacent rows of battery cells 20 arranged along the first direction X included in the battery 10, the fire-extinguishing pipe 13 may be provided as a curved communicating pipe with more bends and is controlled by a set of valves, or may be provided as multiple communicating pipes respectively controlled by multiple sets of valves. For example, the multiple communicating pipes may include at least one of linear pipes, U-shaped pipes, or S-shaped pipes. This is not limited in this embodiment of this application. For ease of description, the fire-extinguishing pipe 13 being a linear pipe is used as an example for description in this embodiment of this application.

The set of valves in this embodiment of this application includes an inlet valve and/or an outlet valve. The inlet valve is configured to fill the fire-extinguishing pipe 13 with the fire-extinguishing medium, and in contrast, the outlet valve is configured to discharge the fire-extinguishing medium to the outside. For example, a circulation of the fire-extinguishing medium in the fire-extinguishing pipe 13 can be implemented by providing both the inlet valve and the outlet valve, so that the fire-extinguishing pipe 13 can further be used for cooling or heating when not broken. In addition, the position of the valve can be disposed depending on an actual application.

Figure 6:
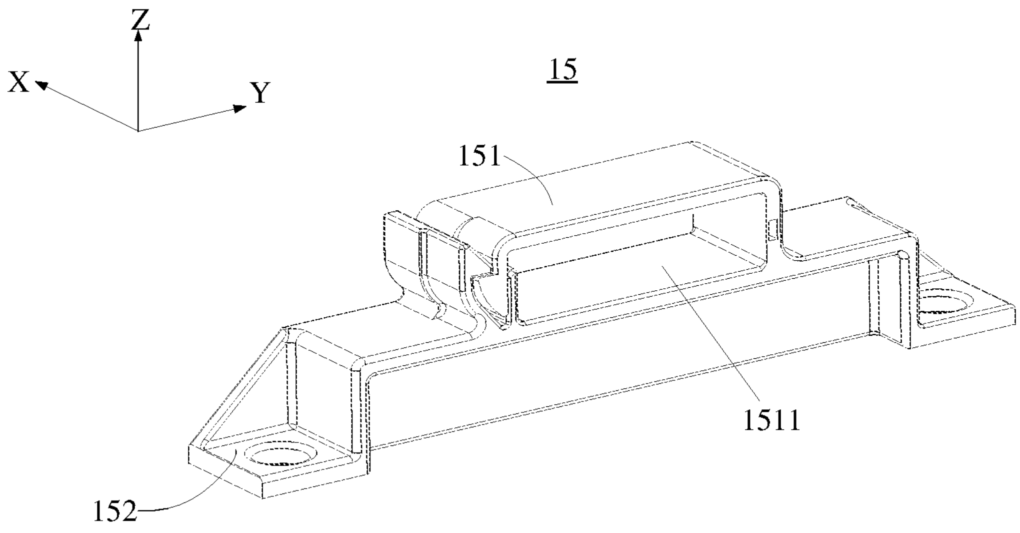
FIG. 6 is a schematic structural diagram of a fastener according to an embodiment of this application.

Optionally, as shown in FIG. 6, the fastener 15 includes a limiting structure 151 and connecting structures 152, where the limiting structure 151 is configured to limit the fire-extinguishing pipe 13, and the connecting structure 152 is configured to be fixedly connected to the restraining member 14.

Optionally, the limiting structure 151 and the connecting structure 152 may be integrally formed. Alternatively, the limiting structure 151 and the connecting structure 152 may be separate components fixedly connected together.

The limiting structure 151 limits the fire-extinguishing pipe 13 and the connecting structure 152 fastens the fire-extinguishing pipe 13 to the first surface 141 of the restraining member 14, so that position change of the fire-extinguishing pipe 13 can be avoided when an electric apparatus (such as an electric vehicle) on which the battery 10 is located is in motion. In addition, this can prevent the fire-extinguishing pipe 13 from being blown off when the pressure relief mechanism of the battery cell 20 located at an end is actuated, while such blow-off makes it impossible for the fire-extinguishing medium released to enter the battery cell 20 at the end. Therefore, the battery 10 at the end can get timely fire-extinguishing when thermal runaway occurs on the battery 10, improving the safety performance of batteries 10.

Figure 7:
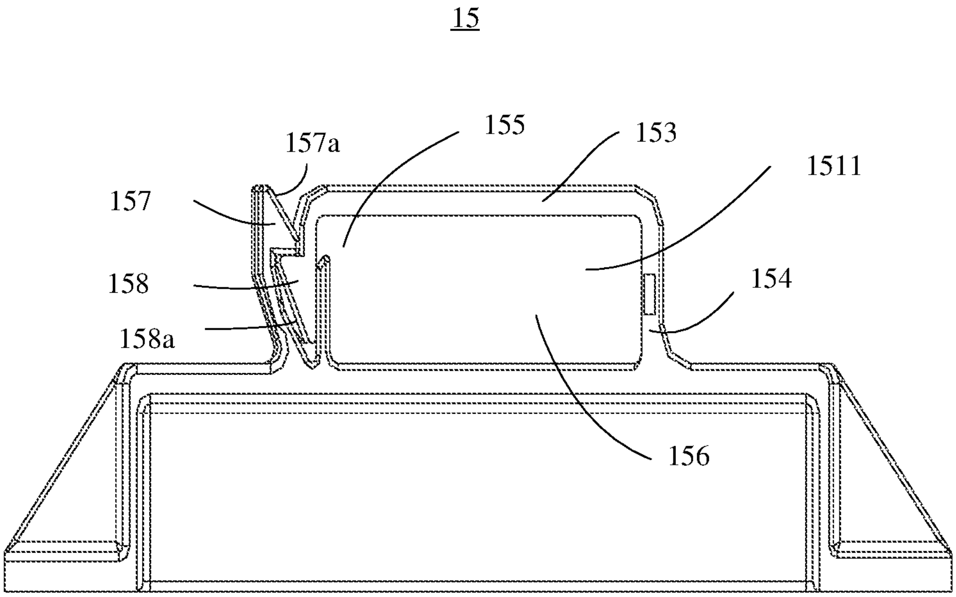
FIG. 7 is a schematic cross-sectional view of a fastener according to an embodiment of this application.

As shown in FIG. 7, the limiting structure 151 includes a first limiting portion 153 and a second limiting portion 154 that fit with each other, where the first limiting portion 153 and the second limiting portion 154 together form a through hole 1511 along the first direction X, the fire-extinguishing pipe 13 is configured to pass through the through hole 1511 and abut against an inner wall of the through hole 1511 so that the fire-extinguishing pipe 13 is limited.

Optionally, the through hole 1511 may have a closed inner wall, as shown in FIG. 7. The inner wall of the through hole 1511 may surround the outer periphery of the fire-extinguishing pipe 13, where a shape of the through hole 1511 depends on a shape of the outer periphery of the fire-extinguishing pipe. The through hole 1511 is configured to limit a position of the fire-extinguishing pipe in the second direction Y and/or a third direction Z, in addition to accommodating the fire-extinguishing pipe 13. The first direction X, the second direction Y, and the third direction Z are perpendicular to each other.

It should be understood that in this embodiment of this application, the fire-extinguishing pipe 13 abutting against the inner wall of the through hole 1511 may mean that the fire-extinguishing pipe 13 is in contact with the inner wall of the through hole 1511, or may mean that there is a certain gap between the fire-extinguishing pipe 13 and the inner wall of the through hole 1511, so that the fire-extinguishing pipe 13 abuts against the inner wall of the through hole 1511 during expansion and does not drive the fastener 15 to move.

With the fire-extinguishing pipe 13 disposed inside the through hole 1511, limitation of the fire-extinguishing pipe 13 can be implemented, especially limitation of the fire-extinguishing pipe 13 in the third direction Z, and blow-off of the fire-extinguishing pipe 13 can be prevented when the pressure relief mechanism 213 of the battery cell 20 is actuated. In addition, since the first limiting portion 153 and the second limiting portion 154 forming the through hole 1511 fit with each other, the mounting and dismounting of the fire-extinguishing pipe 13 is facilitated.

Further, refer to FIG. 7. The first limiting portion 153 includes a first recess 155, where an opening of the first recess 155 faces toward the battery cell 20, and a first buckle 158 is provided on a side wall of the first recess 155; the second limiting portion 154 includes a second recess 156, where an opening of the second recess 156 is disposed facing away from the battery cell 20, and a second buckle 157 is provided on a side wall of the second recess 156; the first recess 155 and the second recess 156 are disposed opposite each other to form the through hole 1511; and the first buckle 158 and the second buckle 157 mate with each other to implement fitting of the first limiting portion 153 and the second limiting portion 154.

Optionally, an outer side wall of the first recess 155 is provided with the first buckle 158, and an inner side wall of the second recess 156 is provided with the second buckle 157. The side wall of the second recess 156 wraps around the side wall of the first recess 155 when the first buckle 158 and the second buckle 157 fit with each other. Alternatively, an inner side wall of the first recess 155 is provided with the first buckle 158, and an outer side wall of the second recess 156 is provided with the second buckle 157. The side wall of the first recess 155 wraps around the side wall of the second recess 156 when the first buckle 158 and the second buckle 157 fit with each other. Alternatively, when both ends of the first recess 155 and the second recess 156 fit with each other via the first buckle 158 and the second buckle 157, the first buckle 158 is provided on an inner side wall of the first recess 155 on one end, and the second buckle 157 is provided on an outer side wall of the second recess 156 on the same end; and the first buckle 158 is provided on an outer side wall of the first recess 155 on the other end, and the second buckle 157 is provided on an inner side wall of the second recess 156 on the same end.

With the first recess 155 of the first limiting portion 153 and the second recess 156 of the second limiting portion 154 disposed opposite each other to form the through hole 1511 for accommodating the fire-extinguishing pipe 13, the fire-extinguishing pipe 13 can be limited, and blow-off of the fire-extinguishing pipe 13 can be prevented when the pressure relief mechanism 213 of the battery cell 20 is actuated. In addition, with the first buckle 158 and the second buckle 157 disposed on the side walls of the first recess 155 and the second recess 156, the first limiting portion 153 and the second limiting portion 154 can fit with each other, thereby facilitating mounting and dismounting of the fire-extinguishing pipe 13.

Still refer to FIG. 7. The first buckle 158 includes a first inclined surface **158*a* and the second buckle 157 includes a second inclined surface 157*a*, the first inclined surface 158*a* and the second inclined surface 157*a* corresponding to each other, and the first inclined surface 158*a* and the second inclined surface 157*a* are configured to guide the first buckle 158 and the second buckle 157** to mate with each other.

Specifically, the first inclined surface **158*a* is inclined relative to the first surface 141 and the second inclined surface 157*a* is inclined relative to the first surface 141**.

Optionally, the first inclined surface 158*a* may be parallel to the second inclined surface 157*a*.

The first inclined surface 158*a* and the second inclined surface 157*a* may guide the first buckle 158 and the second buckle 157 to mate with each other, facilitate fitting between the first limiting portion 153 and the second limiting portion 154.

Optionally, the first buckle 158 may include a first face perpendicular to the third direction Z and a second face perpendicular to the second direction Y. The first inclined surface 158*a* connects the first face and the second face. Similarly, the second buckle 157 may include a third face perpendicular to the third direction Z and a fourth face perpendicular to the second direction Y. The second inclined surface 157*a* connects the third face and the fourth face. The first inclined surface 158*a* slides along the second inclined surface 157*a* in the direction reaching the battery cell 20 so that the first face and the third face are in complete contact. In this way, when the pressure relief mechanism 213 of the battery cell 20 is actuated, the fire-extinguishing pipe 13 cannot break through the first limiting portion 153 in the third direction Z because the first face blocks the third face, so that the fire-extinguishing pipe 13 is limited.

Optionally, as shown in FIG. 7, a first end of the first limiting portion 153 in the second direction Y is integrally connected to the second limiting portion 154, a second end of the first limiting portion in the second direction Y fits with the second limiting portion 154, and the first limiting portion 153 is configured to be capable of bending at a joint between the first end and the second limiting portion 154.

The first limiting portion 153 and the second limiting portion 154 are integrally connected on one end and fitted with each other on the other end. This can facilitate mounting and dismounting and improve the structural stability of the fastener 15.

In another embodiment of this application, the second limiting portion 154 may include a second recess 156, where an opening of the second recess 156 is disposed facing away from the battery cell 20; and the first limiting portion 153 may be in a form of flat plate, the first limiting portion 153 covering the opening of the second recess 156 to form the through hole 1511. The first limiting portion 153 and the second limiting portion 154 may be connected via fixing members, for example, rivets or bolts.

Figure 8:
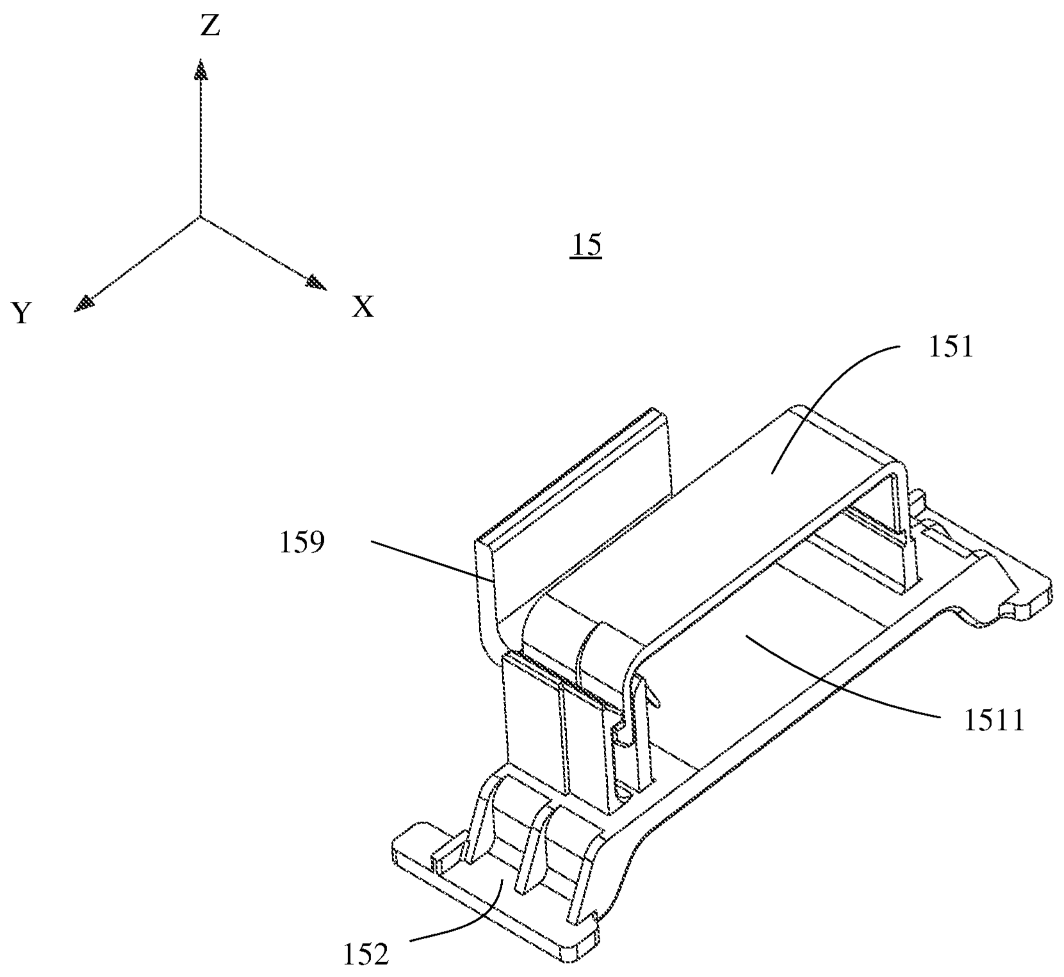
FIG. 8 is another schematic structural diagram of a fastener according to an embodiment of this application.

Optionally, as shown in FIG. 8, the limiting structure 151 further includes a third limiting portion 159, where the third limiting portion 159 is configured to limit a position of the fire-extinguishing pipe 13 in the first direction X.

With the third limiting portion 159 added to the limiting structure 151, the fire-extinguishing pipe 13 can be limited in the first direction X, thereby further increasing the mounting stability of the fire-extinguishing pipe 13, and thus overcoming the problem of untimely fire-extinguishing caused by the position change of the fire-extinguishing pipe 13 when thermal runaway occurs.

Figure 9:
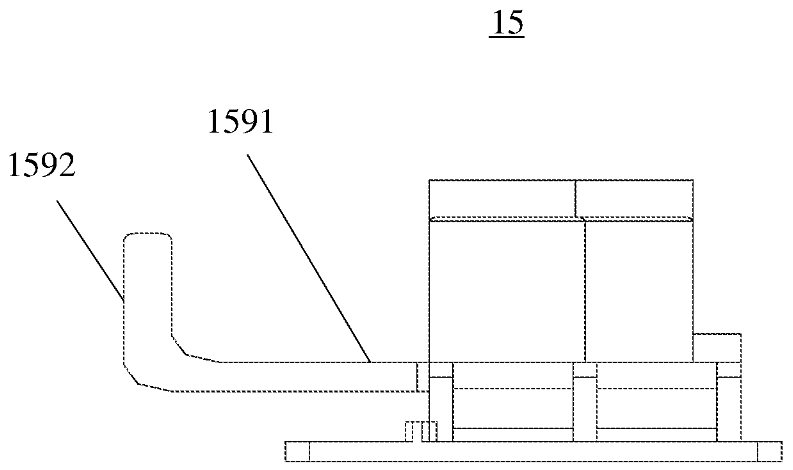
FIG. 9 is another schematic cross-sectional view of a fastener according to an embodiment of this application.

Further, as shown in FIG. 9, the third limiting portion 159 includes a support portion 1591 and a blocking portion 1592, where the support portion 1591 and the blocking portion 1592 are connected. The support portion 1591 is configured to support an end of the fire-extinguishing pipe 13, and the blocking portion 1592 is configured to block movement of the fire-extinguishing pipe 13 along the first direction X.

Optionally, the support portion 1591 may be connected to the bottom wall of the through hole 1511 and located on the same plane. In other words, the support portion 1591 is an extending portion of the bottom wall of the through hole 1511 along the first direction X. The blocking portion 1592 may be perpendicular to the support portion 1591, and the blocking portion 1592 is perpendicular to the first direction X. In other words, the support portion 1591 and the blocking portion 1592 are of an L-shaped structure.

Using the support portion 1591 to support the end of the fire-extinguishing pipe 13 can prevent the end of the fire-extinguishing pipe 13 from shaking along the third direction Z. Using the blocking portion 1592 to block movement of the fire-extinguishing pipe 13 along the first direction X can prevent the fire-extinguishing pipe 13 from shaking along the first direction X. Therefore, the use of the third limiting portion 159 formed by the support portion 1591 and the blocking portion 1592 can improve the mounting stability of the fire-extinguishing pipe 13, thereby improving the safety performance of batteries 10.

It should be understood that the end of this fire-extinguishing pipe 13 may abut against the blocking portion 1592 or may have a certain gap between it and the blocking portion 1592, and the presence of this gap does not affect timely fire-extinguishing of the fire-extinguishing pipe 13 when thermal runaway occurs.

Figure 10:
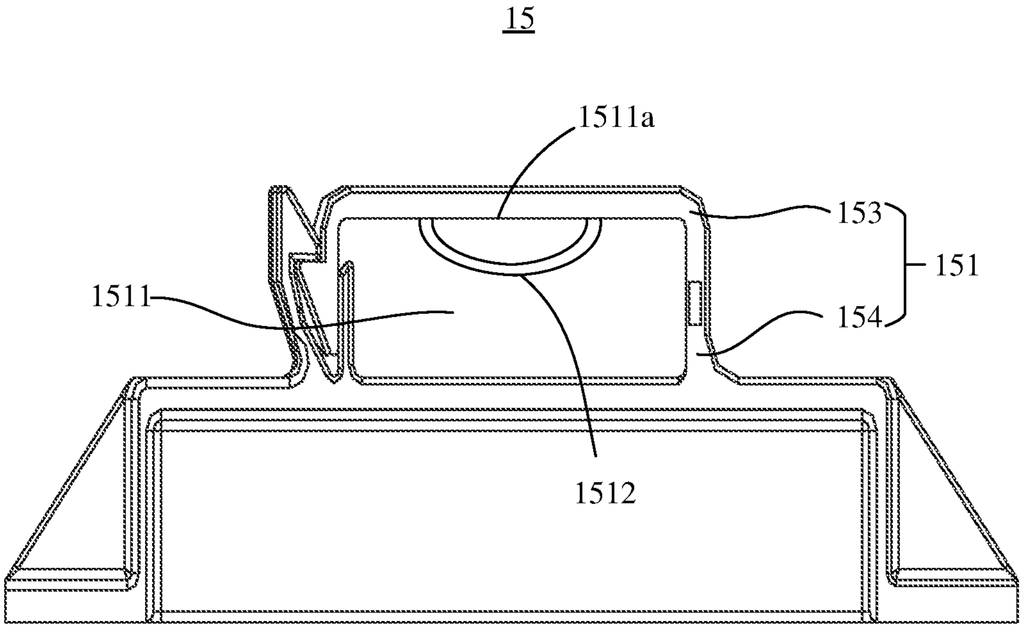
FIG. 10 is still another schematic structural diagram of a fastener according to an embodiment of this application.
Figure 11:
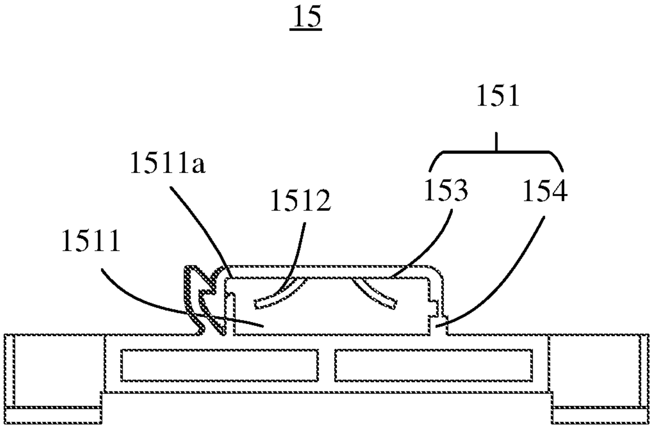
FIG. 11 is still another schematic structural diagram of a fastener according to an embodiment of this application.

Optionally, as shown in FIG. 10, the fastener 15 further includes elastic sheet(s) 1512 attached to an inner wall of the through hole 1511, where the elastic sheet 1512 is configured to implement an interference fit between the fire-extinguishing pipe 13 and the through hole 1511.

Since the thickness of the fire-extinguishing pipe 13 may change under different working conditions, providing the elastic sheet(s) 1512 on the inner wall of the through hole 1511 for accommodating the fire-extinguishing pipe 13 can absorb shock when the fire-extinguishing pipe 13 expands, thereby preventing the fire-extinguishing pipe 13 from driving the first limiting portion 153 to move when the fire-extinguishing pipe 13 expands, thus ensuring the fixing effect of the fastener 15.

Optionally, as shown in FIG. 10, the elastic sheet 1512 is of an arc-shaped structure, and both ends of the elastic sheet 1512 are connected to the inner wall of the through hole 1511. In other words, the elastic sheet 1512 is a semicircular structure.

The elastic sheet 1512 of the semicircular structure is simple in structure and easy to implement.

Optionally, as shown in FIG. 11 to FIG. 14, the elastic sheet 1512 is an arc-shaped structure. One end of the elastic sheet 1512 is connected to the inner wall of the through hole 1511, while the other end of the elastic sheet 1512 is disposed apart from the inner wall of the through hole 1511, that is, the elastic sheet 1512 is a fin-shaped structure.

The elastic sheet 1512 of the fin-shaped structure has a small contact area with the fire-extinguishing pipe 13 and is subjected to less force, and therefore is unlikely to drive the first limiting portion 153 to move when the fire-extinguishing pipe 13 expands, thus further guaranteeing the fastening effect of the fastener 15.

As shown in FIG. 10 to FIG. 14, the elastic sheets 1512 may be provided on a top wall 1511*a* and/or a bottom wall 1511*b* of the through hole 1511, the top wall 1511*a* of the through hole 1511 may be the bottom wall of the first recess 155, and the bottom wall 1511*b* of the through hole 1511 may be the bottom wall of the second recess 156, the top wall 1511*a* and the bottom wall 1511*b* of the through hole 1511 being disposed opposite each other along the third direction Z.

Providing the elastic sheets 1512 on the top wall 1511*a* and/or bottom wall 1511*b* of the through hole 1511 prevents the fire-extinguishing pipe 13 from driving the first limiting portion 153 to move when the fire-extinguishing pipe 13 expands in the third direction Z, thus guaranteeing the fastening effect of the fastener 15.

Figure 12:
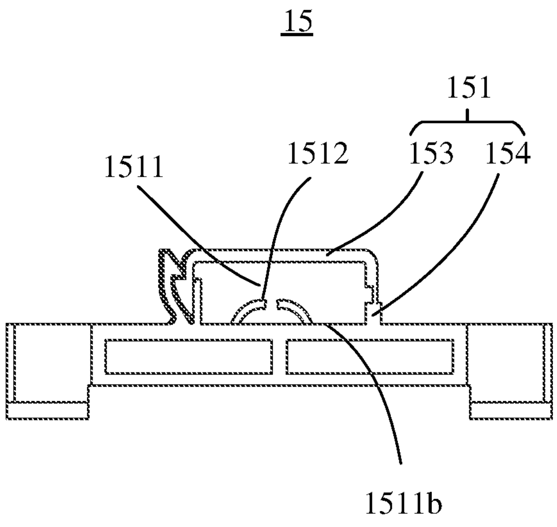
FIG. 12 is still another schematic structural diagram of a fastener according to an embodiment of this application.
Figure 13:
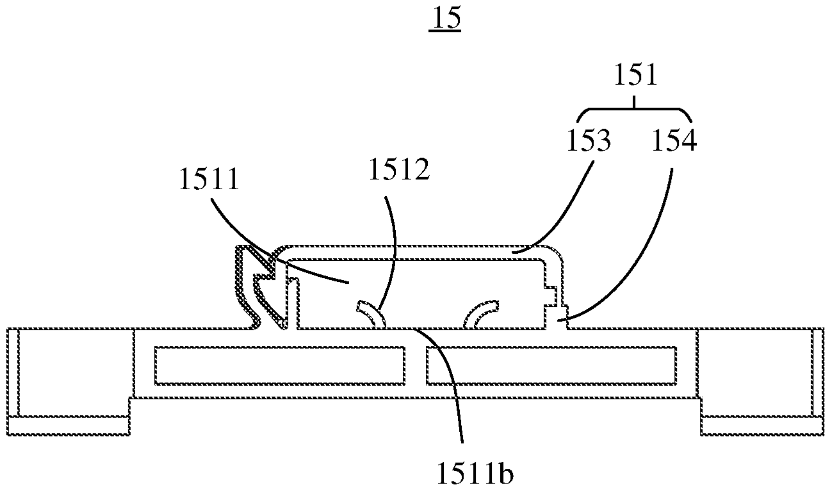
FIG. 13 is a still another schematic structural diagram of a fastener according to an embodiment of this application.
Figure 14:
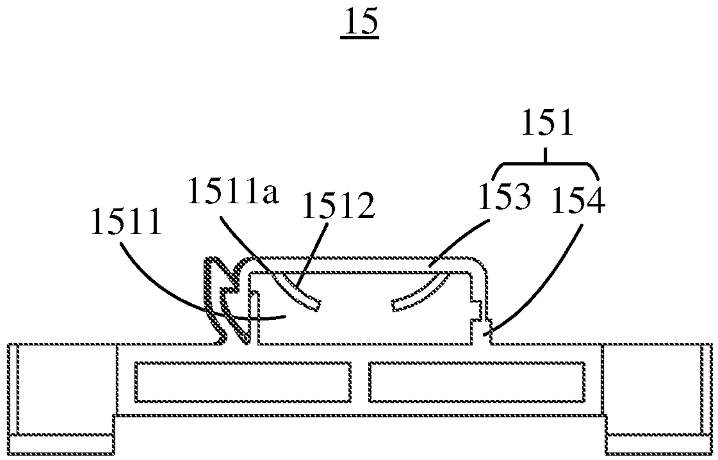
FIG. 14 is a still another schematic structural diagram of a fastener according to an embodiment of this application.

Optionally, the elastic sheets 1512 of the fin-shaped structure may be provided in pair and symmetrically. For example, as shown in FIG. 11 to FIG. 14, the fastener 15 includes two elastic sheets 1512 of the fin-shaped structure, where the two elastic sheets 1512 are provided symmetrically. In addition, in FIG. 11, the two elastic sheets 1512 are provided on the top wall 1511*a* of the through hole 1511, and the two elastic sheets 1512 are bent toward directions leaving each other. In FIG. 12, the two elastic sheets 1512 are provided on the bottom wall 1511*b* of the through hole 1511, and the two elastic sheets 1512 are bent toward directions approaching each other. In FIG. 13, the two elastic sheets 1512 are provided on the bottom wall 1511*b* of the through hole 1511, and the two elastic sheets 1512 are bent toward directions leaving each other. In FIG. 14, the two elastic sheets 1512 are provided on the top wall 1511*a* of the through hole 1511, and the two elastic sheets 1512 are bent toward directions approaching each other.

Providing the elastic sheets 1512 symmetrically can make the two ends of the fire-extinguishing pipe 13 located in the through hole 1511 in the second direction Y receive balanced force when the fire-extinguishing pipe expands, thereby better guaranteeing the fastening effect of the fastener 15.

Figure 15:
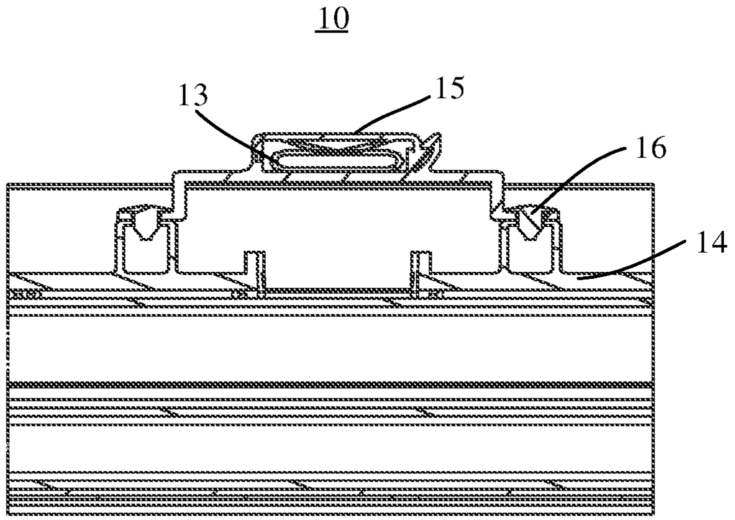
FIG. 15 is a schematic cross-sectional view of a battery according to an embodiment of this application.

Optionally, the connecting structure 152 and the restraining member 14 may be fixedly connected via fixing members 16, for example, as shown in FIG. 15, the fixing members 16 being rivets or bolts.

Figure 16:
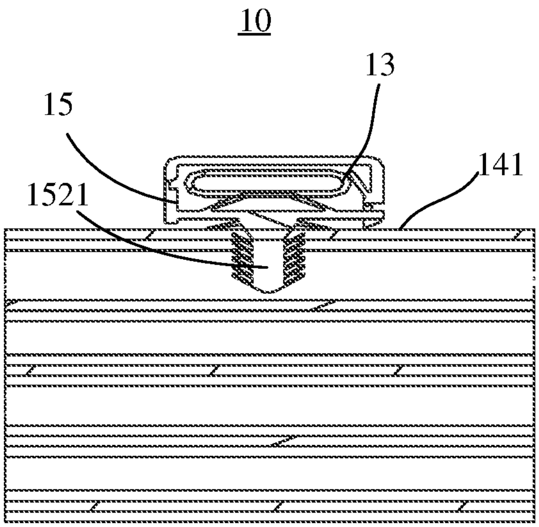
FIG. 16 is another schematic cross-sectional view of a battery according to an embodiment of this application.

Optionally, as shown in FIG. 16, the connecting structure 152 includes a barbed structure 1521, and the first surface 141 is provided with a fitting hole for mating with the barbed structure 1521.

Optionally, the connecting structure 152 and the restraining member 14 may fit with each other. For example, as shown in FIG. 17, the first surface 142 is provided with a slot structure 142, and the connecting structure 152 is fitted between two walls of the slot structure 142, so as to fit with the restraining member 14.

Figure 17:
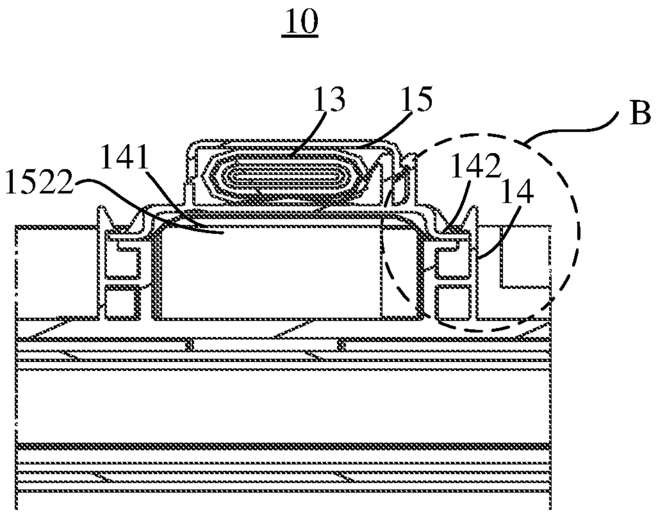
FIG. 17 is still another schematic cross-sectional view of a battery according to an embodiment of this application.
Figure 18:
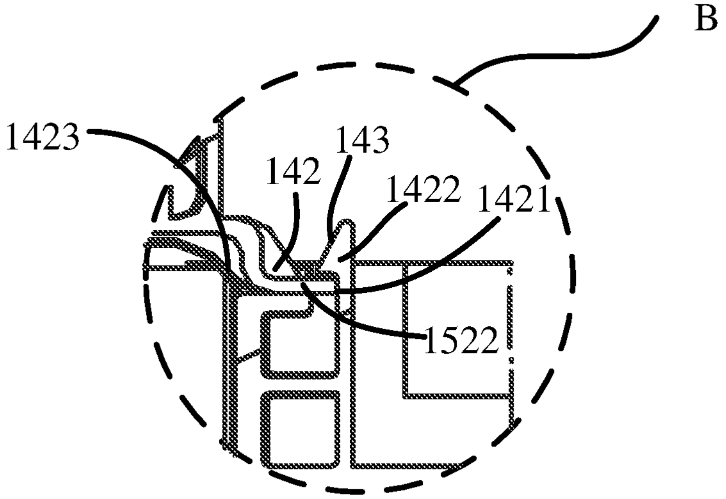
FIG. 18 is a locally enlarged schematic diagram of part B in FIG. 17.

Specifically, FIG. 18 is a locally enlarged diagram of part B in FIG. 17. As shown in FIG. 18, the slot structure 142 includes a first slot wall 1421 and a second slot wall 1423 that are disposed in the second direction Y, where the first slot wall 1421 is perpendicular to the second direction Y, and the first slot wall 1421 is located farther away from the through hole 1512 in the second direction Y than the second slot wall 1423. The connecting structure 152 includes a third recess 1522. An opening of the third recess 1522 faces toward the battery cell 20, and a side wall of the third recess 1522 is provided with a bending portion 1523 that extends along the second direction Y and that bends away from the through hole 1511. The bending portion 1523 is clamped between the first slot wall 1421 and the second slot wall 1423 to limit the movement of the fastener in the second direction Y.

Further, the top of the first slot wall 1421 is provided with a protrusion structure 1422 extending in the second direction Y and protruding toward the through hole 1511, and the bending portion 1523 is provided between the bottom wall of the slot structure 142 and the protrusion 1422 to limit the movement of the fastener 15 in the third direction Z.

It should be understood that in this embodiment of this application, the second slot wall 1423 may or may not be perpendicular to the second direction Y, which may depend on a shape of the third recess 1522. For example, if the side wall of the third recess 1522 is perpendicular to the bottom wall thereof, the second slot wall 1423 may be perpendicular to the second direction Y. For another example, if the side wall of the third recess 1522 is not perpendicular to the bottom wall thereof, the second slot wall 1423 may not be perpendicular to the second direction Y either.

It should also be understood that the second limiting portion 154 and the connecting structure 152 in this embodiment of this application may be integrally formed. For example, the bottom wall of the second recess 156 of the second limiting portion 154 is the bottom wall of the third recess 1522 of the connecting structure 152.

An embodiment of this application further provides an electric apparatus, where the electric apparatus may include the battery 10 in the foregoing embodiments, and the battery 10 is configured to supply electric energy to the electric apparatus.

Optionally, the electric apparatus can be a vehicle 1, a ship, or a spacecraft.

The battery and the electric apparatus in the embodiments of this application are described above, and a method and an apparatus for preparing battery in the embodiments of this application are described below. For content that is not described in detail, refer to the foregoing embodiments.

Figure 19:
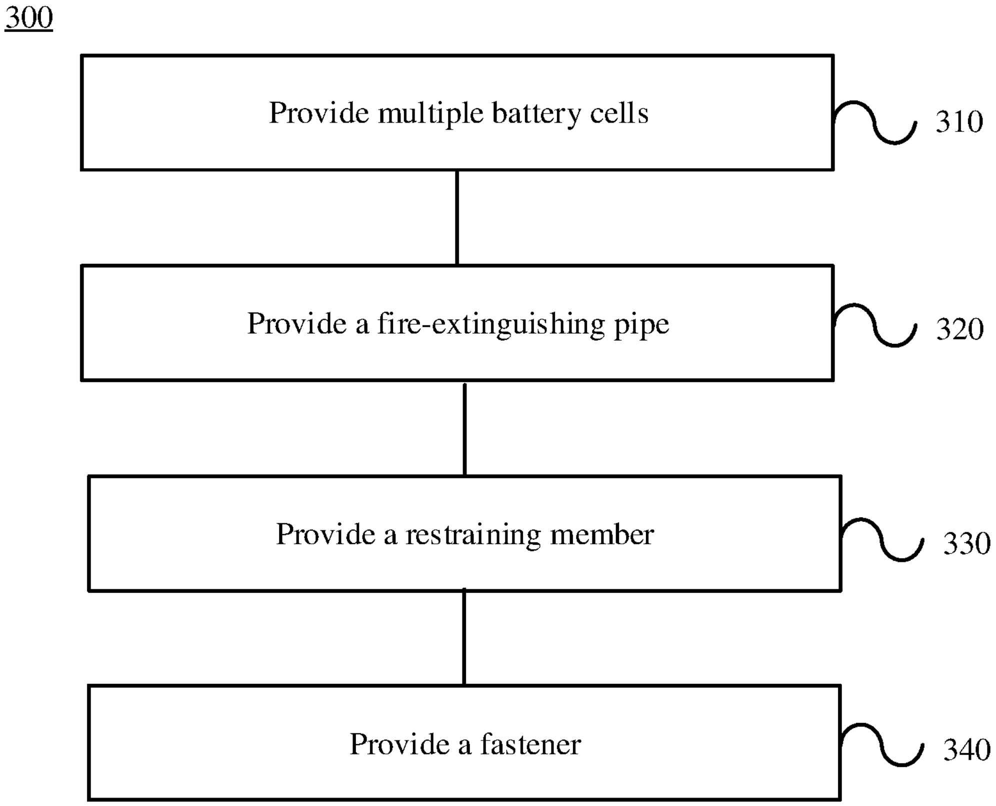
FIG. 19 is a schematic block diagram of a method for preparing a battery according to an embodiment of this application.

FIG. 19 is a schematic flowchart of a method 300 for preparing a battery according to an embodiment of this application. The battery may be the battery 10 provided in the various embodiments described above. As shown in FIG. 19, the method 300 may include the following steps.

S310. Provide multiple battery cells 20.

In an embodiment, the multiple battery cells 20 may be arranged in a first direction X, where the battery cell 20 is provided with a pressure relief mechanism 213, the pressure relief mechanism 213 being configured to be actuated when internal pressure or temperature of the battery cell 20 reaches a threshold, to relieve the internal pressure.

S320: Provide a fire-extinguishing pipe 13.

In an embodiment, the fire-extinguishing pipe 13 is configured to accommodate a fire-extinguishing medium, where the fire-extinguishing pipe 13 is configured to release the fire-extinguishing medium during actuation of the pressure relief mechanism 213.

S330. Provide a restraining member 14.

In an embodiment, the restraining member 14 is disposed at an end of the multiple battery cells 20 along the first direction X, where the restraining member 14 is configured to restrain the multiple battery cells 20 in the first direction X.

Optionally, the restraining member 14 is an end plate in a box of the battery 10. Alternatively, the restraining member 14 is a parting beam in a box of the battery 10.

S340. Provide a fastener 15.

In an embodiment, the fastener 15 is attached to a surface of the restraining member 14 facing toward the fire-extinguishing pipe 13, and the fastener 15 is configured to fasten the fire-extinguishing pipe 13.

Figure 20:
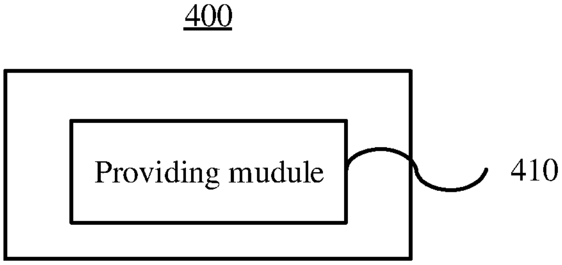
FIG. 20 is a schematic block diagram of an apparatus for preparing a battery according to an embodiment of this application.

FIG. 20 is a schematic block diagram of an apparatus 400 for preparing a battery according to an embodiment of this application. The battery may be the battery 100 provided in the various embodiments described above. As shown in FIG. 20, the apparatus 400 for preparing a battery may include a providing module 410.

The providing module 410 is configured to provide multiple battery cells 20, the multiple battery cells 20 arranged in a first direction X, where the battery cell 20 is provided with a pressure relief mechanism 213, the pressure relief mechanism 213 being configured to be actuated when internal pressure or temperature of the battery cell 20 reaches a threshold, to relieve the internal pressure.

The providing module 410 is further configured to provide a fire-extinguishing pipe 13 configured to accommodate a fire-extinguishing medium, where the fire-extinguishing pipe 13 is configured to release the fire-extinguishing medium during actuation of the pressure relief mechanism 213.

The providing module 410 is further configured to provide a restraining member 14 disposed at an end of the multiple battery cells 20 along the first direction X, where the restraining member 14 is configured to restrain the multiple battery cells 20 in the first direction X.

The providing module 410 is further configured to provide a fastener 14 attached to a surface of the restraining member 14 facing toward the fire-extinguishing pipe 13, and the fastener is configured to fasten the fire-extinguishing pipe 13.

Although this application has been described with reference to some embodiments, various modifications to this application and replacements of the components therein with equivalents can be made without departing from the scope of this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. A battery, comprising:

multiple battery cells arranged in a first direction, wherein each battery cell is provided with a pressure relief mechanism, the pressure relief mechanism being configured to be actuated in response to internal pressure or temperature of the battery cell reaching a threshold, to relieve the internal pressure;

a fire-extinguishing pipe configured to accommodate a fire-extinguishing medium, wherein the fire-extinguishing pipe is configured to release the fire-extinguishing medium during actuation of the pressure relief mechanism;

a restraining member disposed at an end of the multiple battery cells along the first direction, wherein the restraining member is configured to restrain the multiple battery cells in the first direction; and a fastener attached to a surface of the restraining member facing toward the fire-extinguishing pipe, wherein the fastener is configured to fasten the fire-extinguishing pipe and comprises a limiting structure configured to limit the fire-extinguishing pipe and a connecting structure configured to be fixedly connected to the restraining member, the limiting structure comprising a first limiting portion and a second limiting portion that fit with each other, the first limiting portion and the second limiting portion together forming a through hole along the first direction, and the fire-extinguishing pipe being configured to pass through the through hole and abutting against an inner wall of the through hole so that the fire-extinguishing pipe is limited.

2. The battery according to claim 1, wherein:

the first limiting portion comprises a first recess, wherein an opening of the first recess faces toward the battery cell, and a first buckle is provided on a side wall of the first recess;

the second limiting portion comprises a second recess, wherein an opening of the second recess is disposed facing away from the battery cell, and a second buckle is provided on a side wall of the second recess;

the first recess and the second recess are disposed opposite each other to form the through hole; and the first buckle and the second buckle mate with each other to implement fitting of the first limiting portion and the second limiting portion.

3. The battery according to claim 2, wherein the first buckle and the second buckle comprise corresponding inclined surfaces, wherein the inclined surfaces are configured to guide the first buckle and the second buckle to mate with each other.

4. The battery according to claim 1, wherein a first end of the first limiting portion is integrally connected to the second limiting portion, a second end of the first limiting portion fits with the second limiting portion, and the first limiting portion is configured to be capable of bending at a joint between the first end and the second limiting portion.

5. The battery according to claim 1, wherein the fastener further comprises an elastic sheet attached to an inner wall of the through hole, wherein the elastic sheet is configured to implement an interference fit between the fire-extinguishing pipe and the through hole.

6. The battery according to claim 5, wherein:

the elastic sheet has an arc-shaped structure, wherein both ends of the elastic sheet are connected to the inner wall of the through hole; or one end of the elastic sheet is connected to the inner wall of the through hole, and another end of the elastic sheet is disposed apart from the inner wall of the through hole.

7. The battery according to claim 6, wherein the elastic sheet is one of a plurality of elastic sheets provided on a top wall and/or a bottom wall of the through hole, and the elastic sheets are provided symmetrically.

8. The battery according to claim 1, wherein the limiting structure comprises a third limiting portion configured to limit a position of the fire-extinguishing pipe in the first direction.

9. The battery according to claim 8, wherein the third limiting portion comprises a support portion and a blocking portion that are connected to each other, wherein the support portion is configured to support an end of the fire-extinguishing pipe, and the blocking portion is configured to block movement of the fire-extinguishing pipe along the first direction.

10. The battery according to claim 1, wherein:

the connecting structure fits with the restraining member; or the connecting structure is fixedly connected to the restraining member via fixing members.

11. An electric apparatus, comprising the battery according to claim 1, wherein the battery is configured to supply electric energy to the electric apparatus.

12. A method for preparing a battery, comprising:

providing multiple battery cells, wherein the multiple battery cells are arranged in a first direction, and each battery cell is provided with a pressure relief mechanism, the pressure relief mechanism being configured to be actuated in response to internal pressure or temperature of the battery cell reaching a threshold, to relieve the internal pressure;

providing a fire-extinguishing pipe configured to accommodate a fire-extinguishing medium, wherein the fire-extinguishing pipe is configured to release the fire-extinguishing medium during actuation of the pressure relief mechanism;

providing a restraining member disposed at an end of the multiple battery cells along the first direction, wherein the restraining member is configured to restrain the multiple battery cells in the first direction; and providing a fastener attached to a surface of the restraining member facing toward the fire-extinguishing pipe, wherein the fastener is configured to fasten the fire-extinguishing pipe and comprises a limiting structure configured to limit the fire-extinguishing pipe and a connecting structure configured to be fixedly connected to the restraining member, the limiting structure comprising a first limiting portion and a second limiting portion that fit with each other, the first limiting portion and the second limiting portion together forming a through hole along the first direction, and the fire-extinguishing pipe being configured to pass through the through hole and abutting against an inner wall of the through hole so that the fire-extinguishing pipe is limited.

13. An apparatus for preparing a battery, comprising:

a providing module configured to:

provide multiple battery cells, wherein the multiple battery cells are arranged in a first direction, and each battery cell is provided with a pressure relief mechanism, the pressure relief mechanism being configured to be actuated in response to internal pressure or temperature of the battery cell reaching a threshold, to relieve the internal pressure;

provide a fire-extinguishing pipe configured to accommodate a fire-extinguishing medium, wherein the fire-extinguishing pipe is configured to release the fire-extinguishing medium during actuation of the pressure relief mechanism;

provide a restraining member disposed at an end of the multiple battery cells along the first direction, wherein the restraining member is configured to restrain the multiple battery cells in the first direction; and provide a fastener attached to a surface of the restraining member facing toward the fire-extinguishing pipe, wherein the fastener is configured to fasten the fire-extinguishing pipe and comprises a limiting structure configured to limit the fire-extinguishing pipe and a connecting structure configured to be fixedly connected to the restraining member, the limiting structure comprising a first limiting portion and a second limiting portion that fit with each other, the first limiting portion and the second limiting portion together forming a through hole along the first direction, and the fire-extinguishing pipe being configured to pass through the through hole and abutting against an inner wall of the through hole so that the fire-extinguishing pipe is limited.

* * * * *